(12) United States Patent
Lee et al.

(10) Patent No.: US 8,645,791 B2
(45) Date of Patent: Feb. 4, 2014

(54) DATA CACHE CONTROLLER, DEVICES HAVING THE SAME, AND METHOD OF OPERATING THE SAME

(75) Inventors: Sung Hyun Lee, Hwaseong-si (KR); Jun Hee Yoo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/446,345

(22) Filed: Apr. 13, 2012

(65) Prior Publication Data

US 2013/0117627 A1    May 9, 2013

(30) Foreign Application Priority Data

Nov. 7, 2011    (KR) .................. 10-2011-0115052

(51) Int. Cl.
*H03M 13/00*    (2006.01)
*G11C 29/00*    (2006.01)

(52) U.S. Cl.
USPC ........................................ 714/758; 714/764

(58) Field of Classification Search
None
See application file for complete search history.

(56) References Cited

U.S. PATENT DOCUMENTS

| | | | | |
|---|---|---|---|---|
| 6,772,383 | B1* | 8/2004 | Quach et al. ................ | 714/746 |
| 7,395,489 | B2 | 7/2008 | Itou et al. | |
| 7,533,321 | B2* | 5/2009 | Bell et al. ................... | 714/763 |
| 7,673,216 | B2* | 3/2010 | Hino et al. .................. | 714/758 |
| 7,689,891 | B2* | 3/2010 | Bell et al. ................... | 714/768 |
| 8,205,136 | B2* | 6/2012 | Bell et al. ................... | 714/763 |
| 2004/0047209 | A1* | 3/2004 | Lien et al. ................... | 365/202 |
| 2007/0044004 | A1* | 2/2007 | Hino et al. .................. | 714/763 |
| 2007/0079216 | A1* | 4/2007 | Bell et al. ................... | 714/763 |
| 2008/0301531 | A1* | 12/2008 | Bell et al. ................... | 714/768 |
| 2009/0217140 | A1 | 8/2009 | Jo et al. | |
| 2010/0185904 | A1* | 7/2010 | Chen ........................... | 714/54 |
| 2012/0117428 | A1* | 5/2012 | Fukuda ....................... | 714/54 |

FOREIGN PATENT DOCUMENTS

| | | |
|---|---|---|
| JP | 11353242 B2 | 12/1999 |
| JP | 2004030527 A | 1/2004 |
| KR | 20090092628 A | 9/2009 |

* cited by examiner

*Primary Examiner* — Guerrier Merant
(74) *Attorney, Agent, or Firm* — Harness, Dickey & Pierce, P.L.C.

(57) ABSTRACT

An method of operating a data cache controller is provided. The method includes transmitting first data output from a data cache to a central processing unit (CPU) core with a first latency and transmitting second data to the CPU core with a second latency greater than the first latency. The first latency is a delay between a read request to the data cache and transmission of the first data according to execution of a first instruction fetched from an instruction cache, and the second latency is a delay between a read request to the data cache and transmission of the second data according to execution of a second instruction fetched from the instruction cache.

19 Claims, 10 Drawing Sheets

DATA CACHE CONTROLLER, DEVICES HAVING THE SAME, AND METHOD OF OPERATING THE SAME

CROSS-REFERENCE TO RELATED APPLICATION

This application claims priority under 35 U.S.C. §119 to Korean Patent Application No. 10-2011-0115052, filed on Nov. 7, 2011 in the Korean Intellectual Property Office (KIPO), the entire contents of which are incorporated herein by reference.

BACKGROUND

Example Embodiment relate to a processor, and more particularly, to a data cache controller which may reduce cache latency, devices having the same and and/or a method of operating the same.

A cache is a component storing data so that a read request or a write request for the data may be served faster. The cache may be embodied in a volatile memory like a static random access memory SRAM. Because of instability of a volatile memory like SRAM, an error correction code (ECC) is used a lot in a high-availability application like a server.

In addition, since the volatile memory becomes more unstable as a process technology gets refined, the ECC is expected to be used in most general applications like an electronic device. Therefore, a cache controller for controlling most caches includes an ECC. The cache controller checks if there is an error in the data when reading data from the cache.

A delay occurs in the cache when the cache controller checks an error first and uses the data for processing. The delay increases cache latency. The cache latency means a delay when writing data between a central processing unit (CPU) and a cache or reading the data.

SUMMARY

At least one example embodiment is directed to a method of operating a cache controller, including transmitting first data output from a data cache to a central processing unit (CPU) core with first latency and transmitting second data to the CPU core with second latency greater than the first latency.

The first latency is a delay between a read request to the data cache and transmission of the first data according to performance of a first instruction fetched from an instruction cache.

The second latency is a delay between a read request to the data cache and transmission of the second data according to performance of a second instruction fetched from the instruction cache.

The first data is transmitted to the CPU core through a first data channel and the second data is transmitted to the CPU core through a second data channel.

An error correction operation is performed on the first data, and the second data is output based on the error correction operation performed on the first data.

The method may further include detecting an error in the first data and transmitting an error signal to the CPU core, performing an error correction on the first data, and transmitting the second data to the CPU core according to a selection signal output from the CPU core in response to the error signal.

A load command used to load the first data on the CPU core is removed from the CPU core based on the error signal.

At least one example embodiment is directed to a processor, including a central processing unit (CPU) core and a data cache controller configured to transmit first data output from a data cache to the CPU core through a first data channel, performing an error correction on the first data and transmitting error-corrected data to the CPU core through a second data channel according to a control of the CPU core 20.

The CPU core may be configured to remove the first data before receiving the error-corrected data.

The CPU core may be configured to remove, from the CPU core, a load instruction for loading the first data on the CPU core based on an error signal.

The CPU core may be configured to fetch, from an instruction cache, a load instruction for loading the error-corrected data onto the CPU core based on an error signal.

The CPU core may be configured to set the first data channel to a default channel to load the first data on the CPU core.

The data cache controller may be configured to restore the second data channel to the first data channel base on a control signal from the CPU core after transmitting the error-corrected data to the CPU core through the second data channel.

According to an example embodiment, the data cache controller may include a selector which may be configured to switch the first data channel and the second data channel according to a selection signal output from the CPU core.

According to another example embodiment, the data cache controller may include an error correction code (ECC) logic unit, which is configured to detect an error included in the first data, output an error signal to the CPU core, performs the error correction operation on the data and output the error-corrected data, and a selector which is configured to transmit the data to the CPU core through the first data channel and transmit the error-corrected data to the CPU core through the second data channel based on a selection signal output from the CPU core based on an error signal.

The CPU core may include a reorder buffer storing a flag corresponding to the error signal and a commit control unit configured to output the selection signal according to the flag.

According to an example embodiment, the CPU core may further include a control logic unit configured to transmit a write enable signal to the data cache controller.

In addition, the CPU core may further include data output from the control logic unit, a data merge unit configured to merge the first data or the error-corrected data and an ECC encoding unit configured encode data output from the data merge unit.

At lease one example embodiment is directed to an electronic device, including a processor and a display configured to display data processed by the processor. The processor includes a central processing unit (CPU) core, an instruction cache configured to store a load instruction, a data cache configured to store data, and a data cache controller configured to perform an error correction on the first data and transmit error-corrected data to the CPU core through a second data channel based on a control of the CPU core after transmitting the first data output from the data cache to the CPU core through a first data channel based on the load instruction fetched by the instruction cache.

The electronic device may be embodied in a personal computer (PC) or a portable device.

According to at least one example embodiment, A data cache controller, may include a control block configured to receive first data from a caching unit and output the first data to a CPU core through a first channel, the control block including an error correction code (ECC) unit configured to generate error corrected data based on the first data and output the error corrected data to the CPU core through a second channel after the first data is output to the CPU core through the first channel.

The control block may further include a selector connected to the first and second channel, and the selector may be configured to selectively choose between transmitting the first data received through the first data channel to the CPU core and transmitting the error corrected data received through the second data channel to the CPU core based on a selection signal output from the processing device.

A data processing unit may include a core processing unit (CPU); and the data cache controller, wherein the CPU is the CPU core.

An electronic device may include a processor including an instruction cache storing a load instruction, a data cache storing data, and the data processing unit; and a display configured to display data processed by the processor, wherein the data cache is the caching unit.

The control block may be configured to output the first data to the CPU based on the load instruction stored in the instruction cache.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE PREFERRED EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
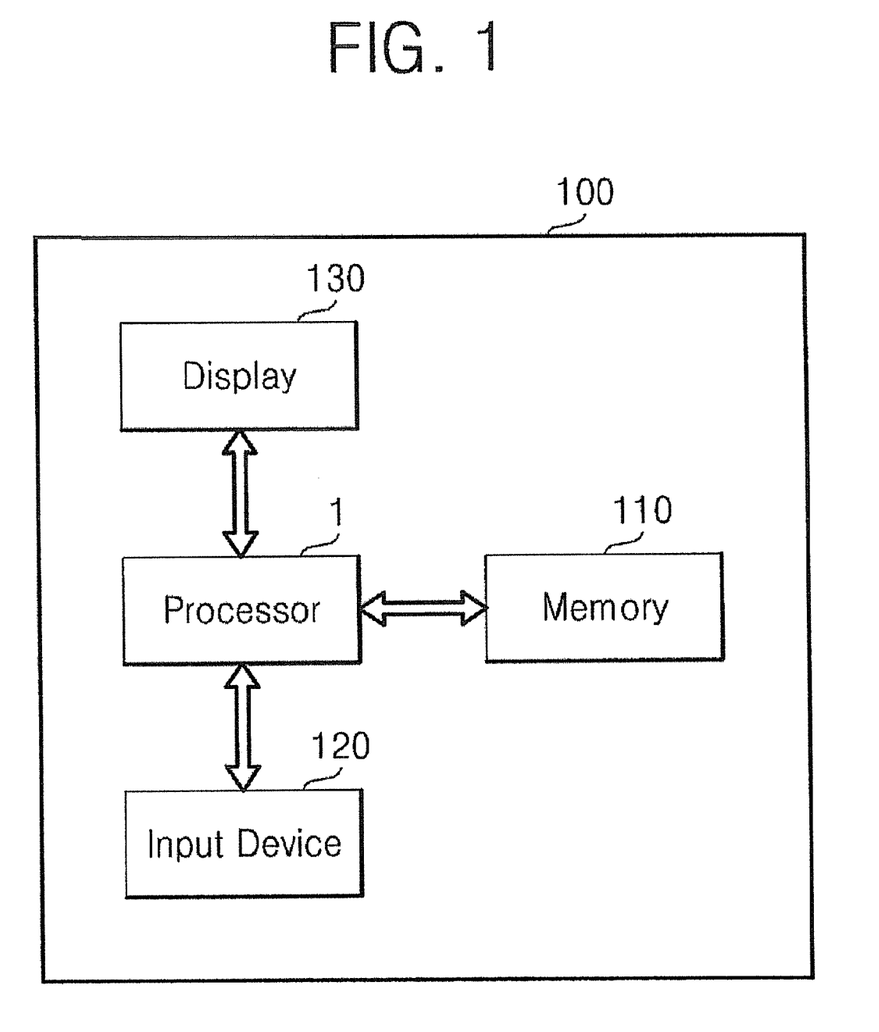
FIG. 1 is a block diagram of an electronic device according to at least one example embodiment.

FIG. 1 is a block diagram of an electronic device according to at least one example embodiment. Referring to FIG. 1, the electronic device 100 may be embodied in a personal computer (PC) or a portable device.

The portable device may be embodied in a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PDN), a handheld game console or a handheld device like an e-book.

The electronic device 100 includes a processor 1, a memory 110, an input device 120 and a display 130 which communicate to each other through a bus.

A processor 1 controls the operation of the electronic device 100. A processor 1 is a unit reading and performing program instructions. According to an example embodiment, the processor 1 may be an application processor.

For example, the processor 1 may perform program instructions, e.g., program instructions generated by an input signal input through an input device 120, read data stored in a memory 110, and display read data through a display 130.

For example, the input device 120 may be embodied in a pointing device such as a touch pad or a computer mouse, a key pad or a keyboard.

Figure 2:
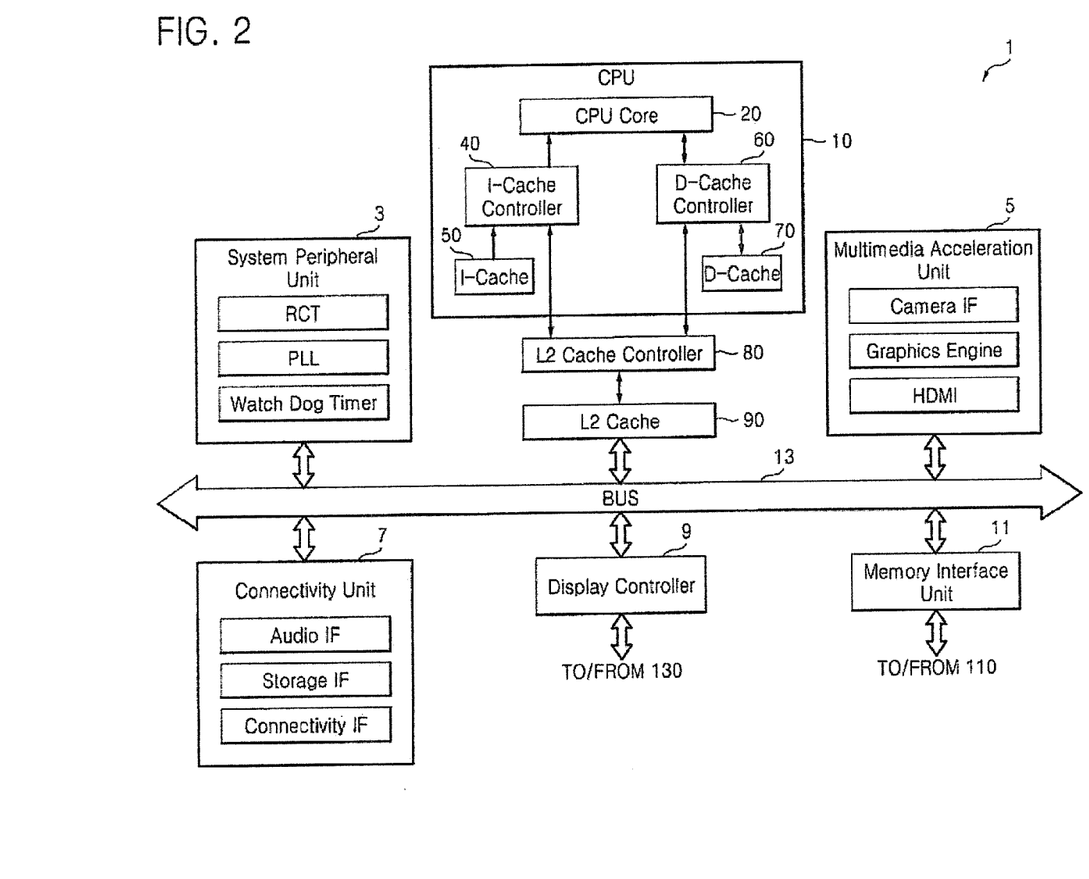
FIG. 2 is a block diagram of the processor illustrated in FIG. 1.

FIG. 2 is a block diagram of the processor illustrated in FIG. 1. Referring to FIGS. 1 and 2, the processor 1 includes a central processing unit (CPU) 10, a L2 cache controller 80, a L2 cache 90 and a memory interface unit 11.

According to an example embodiment, the processor 1 may be embodied in a chip, e.g., a System on Chip (SoC). A CPU 10 may be a part of the processor 1 which may read and perform program instructions.

The processor 1 may include multi-level caches. For example, when a plurality of caches 50 and 70 are level-one caches, a cache 90 may be a level-two cache. Here, a cache 50 may be an instruction cache and a cache 70 may be a data cache.

The L2 cache 90 may be embodied in a volatile memory device, e.g., SRAM.

When the CPU 10 tries to read data, the CPU 10 first checks if the data are stored in the data cache 70. It is because the data cache 70 has a waiting time considerably shorter than the L2 cache 90 or the memory 110. When the CPU 10 can't find data in the data cache 70, e.g., in case of cache miss, the CPU 10 checks the L2 cache 90 through the L2 cache controller 80.

When the CPU 10 can't find data in the data cache 70 or the L2 cache 90, the CPU 10 may read the data from the memory 110 through a memory interface unit 11.

The CPU 10 may access the memory 110 through the memory interface unit 11. For example, the memory 110 may be embodied in a non-volatile memory such as a flash memory or a resistive memory, or embodied in a volatile memory such as a dynamic random access memory (DRAM). In addition the memory 110 may be embodied in a combination of volatile memories.

The L2 cache controller 80 controls the L2 cache 90 under a control of the CPU 10.

The CPU 10 includes a CPU core 20, a plurality of cache controllers 40 and 60, and a plurality of L1 caches 50 and 70. A CPU core 20 is a unit which may perform program instructions. According to an example embodiment, the CPU 10 may include a plurality of CPU cores. An operation and architecture of the CPU core 20 is to be explained in detail referring to FIG. 4.

An instruction cache controller 40 controls an instruction cache 50. The instruction cache 50 is used to speed up executable instruction fetch.

A data cache controller 60 controls the data cache 70. The data cache 70 is used to speed up data fetch and storage. Each of the plurality of L1 caches 50 and 70 may be embodied in a volatile memory, e.g., SRAM.

Figure 3:
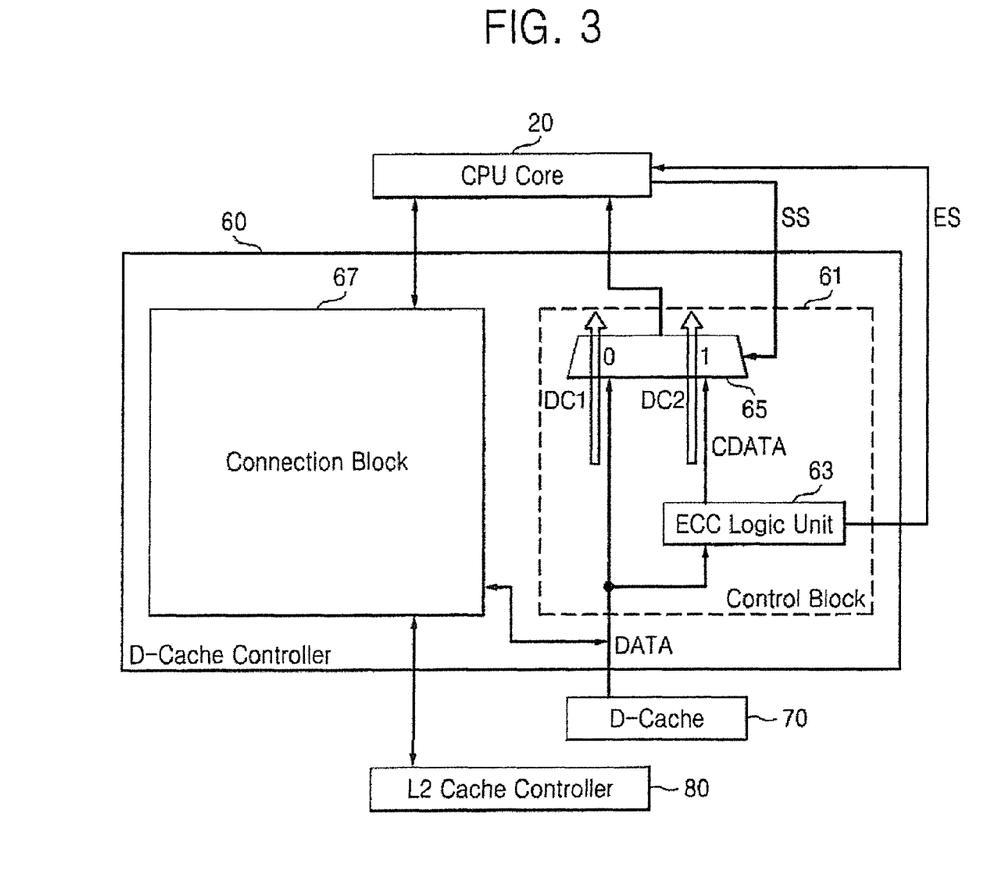
FIG. 3 is a block diagram of the data cache controller illustrated in FIG. 2.

FIG. 3 is a block diagram of the data cache controller illustrated in FIG. 2. Referring to FIGS. 2 and 3, the data cache controller 60 includes a control block 61 for controlling transmission of data between the CPU core 20 and the data cache 70, and a connection block 67 for controlling connection between the CPU core 20 and the L2 cache controller 80.

The control block 61 includes an error correction code (ECC) logic unit 63 and a selector 65.

Data DATA output from the data cache 70 are transmitted to the CPU core 20 through a first data channel DC1, and error-corrected data (CDATA) are transmitted to the CPU core 20 through a second data channel DC2. According to an example embodiment, the first data channel DC1 may be set to a default value. Here, a data channel means a path where data DATA or CDATA are transmitted and it may mean a data bus in particular.

First, data DATA output from the data cache 70 are transmitted to the CPU core 20 through the first data channel DC1. The ECC logic unit 63 may perform an error check, e.g., an ECC check, on data DATA output from the data cache 70. When the ECC logic unit 63 detects an error of data DATA output from the data cache 70, the ECC logic unit 63 may transmit an error signal ES having a first level, e.g., a logic 1 or a high level, to the CPU core 20.

Here, the ECC logic unit 63 corrects an error of data DATA and output error-corrected data CDATA. The CPU core 20 outputs a selection signal SS having a first level in response to an error signal ES having a first level. The selector 65 transmits error-corrected data CDATA to the CPU core 20 through the second data channel DC2 in response to a selection signal SS having a first level.

A first input port of the selector 65 is connected to the data cache 70, a second input port of the selector 65 is connected to the ECC logic unit 63, and an output port of the selector 65 is connected to the CPU core 20. A port may be called a terminal. The selector 65 may be embodied in a multiplexer.

When a selection signal SS output from the CPU core 20 is a second level, e.g., a logic 0 or a low level, the selector 65 transmits data DATA output from the data cache 70 to the CPU core 20 through the first data channel DC1 according to the selection signal SS having a second level. For example, the CPU core 20 may set a level of the selection signal SS to a second level by default whenever processing data.

Afterwards, when the ECC logic unit 63 detects an error of data DATA output from the data cache 70, the ECC logic unit 63 generates an error signal ES having a first level and the CPU core 61 generates a selection signal SS having a first level. Accordingly, the selector 65 changes the first data channel DC1 to the second data channel DC2 in response to the selection signal SS having a first level. That is, since a second input port and an output port of the selector 65 are connected to each other, error corrected data CDATA may be transmitted to the CPU core 20 through the second data channel DC2.

When an error is not detected from data DATA, the ECC logic unit 63 outputs an error signal ES having a second level and the CPU core 20 outputs a selection signal SS having a second level according to an error signal ES having a second level. Accordingly, the selector 65 retains the first data channel DC1 in response to a selection signal SS having a second level.

According to an example embodiment, after error-corrected data CDATA are transmitted to the CPU core 20 completely through the second data channel DC2, the CPU core 20 may output a selection signal SS having a first level. Accordingly, by the selector 65, the second data channel DC2 are restored or switched to the first data channel DC1.

Figure 4:
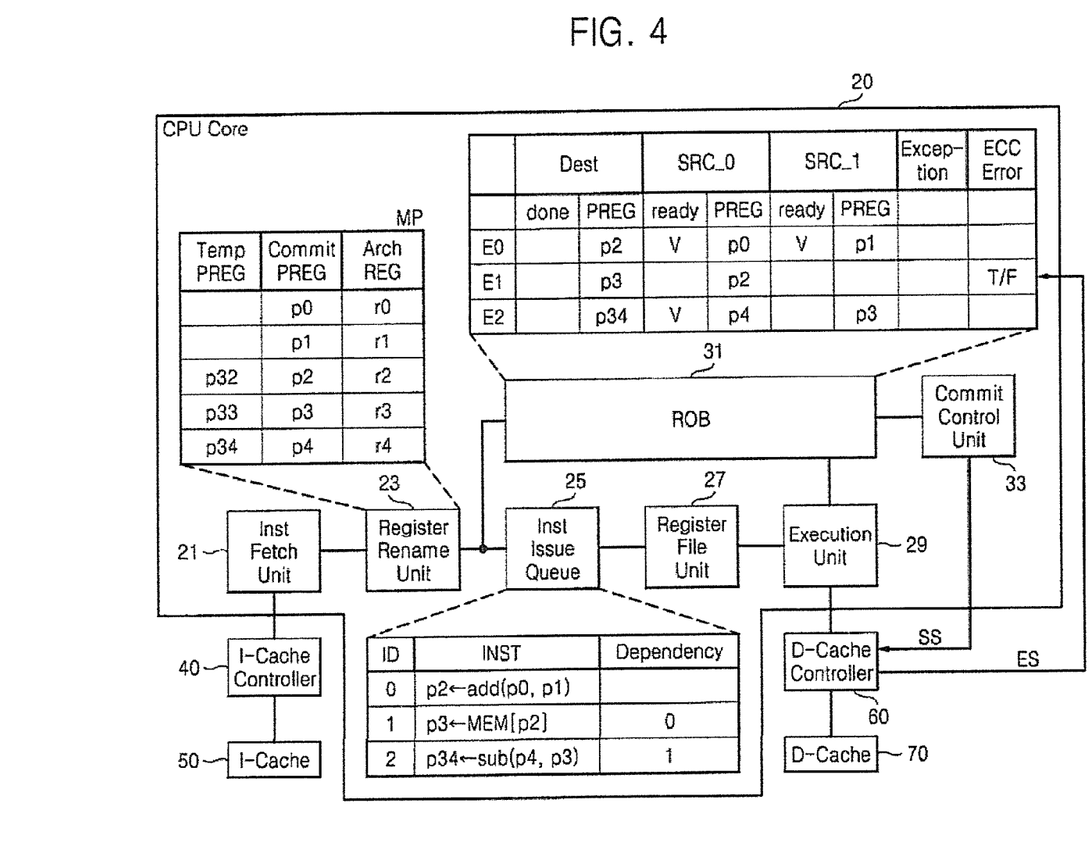
FIG. 4 is an example embodiment of a pipeline of a central processing unit (CPU) core illustrated in FIG. 2.

FIG. 4 is an example embodiment of the pipeline of the CPU core illustrated in FIG. 2. Referring to FIGS. 2 to 4, the CPU core 20 includes an instruction fetch unit 21, a register rename unit 23, an instruction issue queue 25, a register file unit 27, an execution unit 29, a reorder buffer (ROB) 31 and a commit control unit 33.

An instruction fetch unit 21 fetches instructions from an instruction cache 50 according to a program order through an instruction cache controller 40.

For example, the instructions include an arithmetic instruction and a load instruction. For example, the arithmetic instruction may be r2←add(r0, r1) or r4←sub(r4, r3). The r2←add(r0, r1) is an addition instruction. That is, the r2←add (r0, r1) means to add a value of a register r0 and a value of a register r1 and store an added value in the register r2.

The r4←sub(r4, r3) is a subtraction instruction. That is, the r4←sub(r4, r3) means to subtract a value of a register r3 from a value of a register r4 and store a subtracted value in the register r4.

A load instruction is r3←MEM[r2]. The r3←MEM[r2] means to read data from a memory address of the data cache 70 which is specified by a register r2 and store them in a register r3.

For example, arithmetic commands and a load instruction may be stored in addresses 0x4, 0x8 and 0xC of the instruction cache 50.

The instructions are found in an executable program and registers r0, r1, r2, r3 and r4 are architectural registers. The architectural registers are defined by an instruction set architecture (ISA) which is a part of computer architecture related to a program. According to an example embodiment, the architectural registers may be called logical registers.

A register rename unit 23 translates architectural registers (Arch REG) to physical registers (Temp PREG or Commit PREG) by using a mapping table MP mapping the architectural registers Arch REG to the physical registers (Temp PREG or Commit PREG), respectively.

For example, each of the architectural registers (Arch REG: r0, r1, r2, r3 and r4) is mapped to each of the physical registers Commit PREG: p0, p1, p2, p3 and p4.

Physical registers (Temp PREG: p32, p33 and p34) are not used at the beginning.

When an arithmetic instruction, r4←sub(r4, r3), is renamed, a result value should be stored in a temporary rename register, e.g., p34. The temporary rename register is selected among a plurality of physical registers (Temp PREG: e.g., P32 to P34).

Physical registers (Temp PREG or Commit PREG) may be included in the CPU core 20.

Information regarding the renaming operation including physical registers (p0, p1, p2, p3, p4 and p34) performed by the register rename unit 23 are stored in an instruction issue queue 25 and a ROB 31.

The instruction issue queue 25 includes renamed instructions.

An addition instruction in FIG. 4 is expressed as an ID 0, a load instruction is expressed as an ID 1, and a subtraction instruction is expressed as an ID 2. The instruction issue queue 25 determines which instruction is ready to be executed. For example, the instruction issue queue 25 determines which instruction to perform first among an addition instruction ID 0, a load instruction ID 1 and a subtraction instruction ID 2 regardless of a program order.

The instruction issue queue 25 determines an execution order so that the addition instruction ID 0, the load instruction ID 1 and the subtraction instruction ID 2 may be executed in order. The instruction issue queue 25 determines if a register is available for each of the addition instruction ID 0, the load instruction ID 1 and the subtraction instruction ID 2. For example, the instruction issue queue 25 knows registers (p0, p1) of the addition instruction ID 0 are available. Subsequently, an addition instruction storing a result of adding a value of register p0 and a value of a register p1 in a register p2 gets ready.

Other instructions depend on at least a register. For example, the load instruction ID 1 depends on the addition instruction ID 0, and the subtraction instruction ID2 depends on the load instruction ID 1.

The instruction issue queue 25 reads values of registers p0 and p1 from the register file unit 27. The execution unit 29 executes an instruction.

When two operands, e.g., p0 and p1 are ready in an arithmetic instruction, the execution unit 29 executes an addition instruction operation. When performing the load instruction ID1, the execution unit 29 calculates a memory address of the data cache 70 and reads data (e.g., DATA of FIG. 3) from the memory address of the data cache 70 through the data cache controller 60. The memory address is specified by a register r2. Data DATA are read through a first data channel DC1 directly.

The ROB 31 includes a plurality of ROB entries, e.g., E0 to E2. Each of the plurality of ROB entries, e.g., E0 to E2, in the ROB 31 is allocated in a program order.

Each of the plurality of ROB entries E0 to E2 includes a plurality of physical registers PREG. For example, an ROB entry E0 includes an operand (SRC_0=PREG=p0), an operand (SRC_1=PREG=p1) and a physical register (PREG of Dest=p2) for storing a result value obtained as a performance result of an addition instruction.

For example, an ROB entry E1 includes an operand (SRC_0=PREG=p2), and a physical register (PREG of Dest=p3) for storing a result value obtained as a performance result of a load instruction. For example, an ROB entry E2 includes an operand (SRC_0=PREG=p4), an operand (SRC_1=PREG=p3) and a physical register (PREG of Dest=p34) for storing a result value obtained as a performance result of a subtraction instruction.

A 'ready' flag indicates whether or not an operand gets ready, a 'done' flag indicates whether or not a result value is stored in a register p2, p3 or p34, an 'exception' flag indicates whether or not exception occurs, and an 'ECC Error' flag indicates whether or not an error is included in data output from the data cache 70 in FIG. 4. For example, when an operand (p0, p1 or p4) gets ready, the 'ready' flag indicates 'v'.

When an error is included in data DATA output from the data cache 70, the 'ECC Error' flag is set to 'F', and when data DATA output from the data cache 70 does not include an error, the 'ECC Error' flag is set to 'T'.

When an instruction is executed in the execution unit 29, a result value is stored in the ROB 31. For example, after the load instruction ID 1 is executed in the execution unit 29, data DATA output from the data cache 70 are stored in a register p3 of the ROB 31.

The ROB 31 may be embodied in a first in first out (FIFO) buffer. When the addition instruction ID 0, the load instruction ID 1 or the subtraction instruction ID 2 is executed successfully without exception or an error in the ROB 31, the addition instruction ID 0, the load instruction ID1 or the subtraction instruction ID 2 may be committed safely. For example, the addition instruction ID 0 is executed successfully without exception in the ROB 31, a commit control unit 33 controls a register p2 to store a value of the register p2 in the register file unit 27. An entry E0 executed successfully in the ROB 31 is removed.

When an error of data DATA is detected by the ECC logic unit 63 after the load instruction ID 1 that data output from the data cache 70 are stored in a register p3 of the ROB 31 is executed, the ECC logic unit 63 transmits an error signal ES having a first level to the CPU core 20.

When an error signal ES having a first level is received, the CPU core 20 sets an 'ECC Error' flag of the ROB 31 to 'F'. When the 'ECC Error' flag of the ROB 31 is set to 'F', the commit control unit 33 transmits a selection signal SS having a first level to the data cache controller 60. In addition, the load instruction ID 1 is removed from the instruction issue queue 25 and an entry E1 of the ROB 31 is removed. Moreover, an instruction, i.e., the subtraction instruction ID 2, after the load instruction ID 1 is removed from the instruction issue queue 25 and an entry E2 of the ROB 31 is removed.

Instructions ID 1 and ID 2 are fetched from the instruction cache 50 through the instruction fetch unit 21 again and corrected data CDATA are loaded through a second data channel DC2 by the execution unit 29.

Referring to FIG. 2, the processor 1 may further include a system peripheral unit 3, a multimedia acceleration unit 5, a connectivity unit 7 and a display controller 9 according to an example embodiment. Each of the L2 cache 90, the system peripheral unit 3, the multimedia acceleration unit 7, the display controller 9 and a memory interface unit 11 may transmit or receive data or an instruction through a system bus 13.

The system peripheral unit 3 may include a real-time clock RTC, a phase-locked loop PLL and a watch dog timer.

The multimedia acceleration unit 5 includes a graphic engine. According to an example embodiment, the multimedia acceleration unit 5 may include a camera interface, a graphic engine integrated to a video display circuitry to perform a graphic calculation, and a high-definition multimedia interface (HDMI) which is an audio/video interface for transmitting uncompressed digital data.

According to an example embodiment, the multimedia acceleration unit 5 may include an interface according to national television system committee (NTSC)/phase alternate line (PAL) instead of HDMI.

The connectivity unit 7 may include an audio interface Audio IF, a storage interface storage IF like an advanced technology attachment (ATA), and an connectivity interface connectivity IF. For example, the connectivity unit 7 performs communication with an input device 120.

The display controller 9 controls data so that they may be displayed on a display 130.

Figure 5:
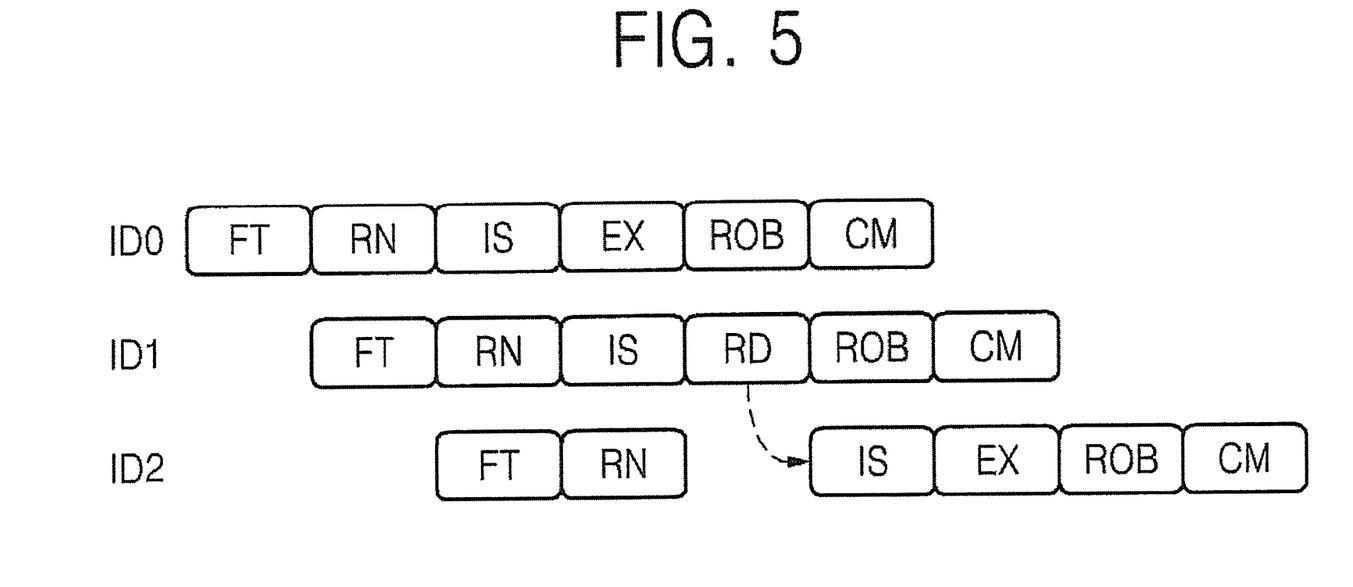
FIG. 5 is a timing diagram of the pipeline of the CPU core illustrated in FIG. 2 when an error is not detected from data according to a load instruction.

FIG. 5 is a timing diagram of a pipeline of the CPU core illustrated in FIG. 2 when an error is not detected from data according to a load instruction. 'ID0' indicates an addition instruction, 'ID1' indicates a load instruction, and 'ID2' indicates a subtraction instruction in FIG. 5.

Referring to FIGS. 2 to 5, the addition instruction ID0 includes a fetch operation FT, a rename operation RN, an issue operation IS, an arithmetic operation EX, a storage operation ROB, and a commit operation CM. The fetch operation FT is executed by an instruction fetch unit 21.

The instruction fetch unit 21 fetches an addition instruction from the instruction cache 50 through the instruction cache controller 40. The rename operation RN is executed by a register rename unit 23. The register rename unit 23 translates architectural registers r0, r1 and r2 to physical registers p0, p1 and p2. The issue operation IS is executed by the instruction issue queue 25. The instruction issue queue 25 determines if registers p0 and p1 are available for the addition instruction ID0. The arithmetic operation EX is executed by the execution unit 29.

The execution unit 29 executes an addition operation and a storage operation ROB storing a result value in the ROB 31. The commit operation CM is executed by the commit control unit 33.

The commit control unit 33 stores a value of a register p2 in the register file unit 27 when an addition instruction is successfully executed without an error in the ROB 31.

An operation of the load instruction ID1 and an operation of the subtraction instruction ID2 are similar to an operation of the addition instruction ID0, so that detailed explanation for these is omitted. An operation of the addition instruction ID0 and an operation of the load instruction ID1 may be executed in parallel. For example, the CPU core 20 may execute a rename operation RN of the addition instruction ID0 and a fetch operation FT of the load instruction ID1 at the same time. The load instruction ID1 executes a read operation RD instead of an arithmetic operation EX. The read operation RD is executed by the execution unit 29.

The execution unit 29 calculates a memory address of the data cache 70 and reads data DATA from the memory address of the data cache 70 through the data cache controller 60.

When an error is not detected from data DATA, the CPU core 20 may execute an issue operation IS of the subtraction instruction ID2 after the read operation RD is executed. Accordingly, the data cache controller 60 may have a cache latency reduced by transmitting data from the data cache 70 to the CPU core 20 without executing an operation for detecting an error on data.

Figure 6:
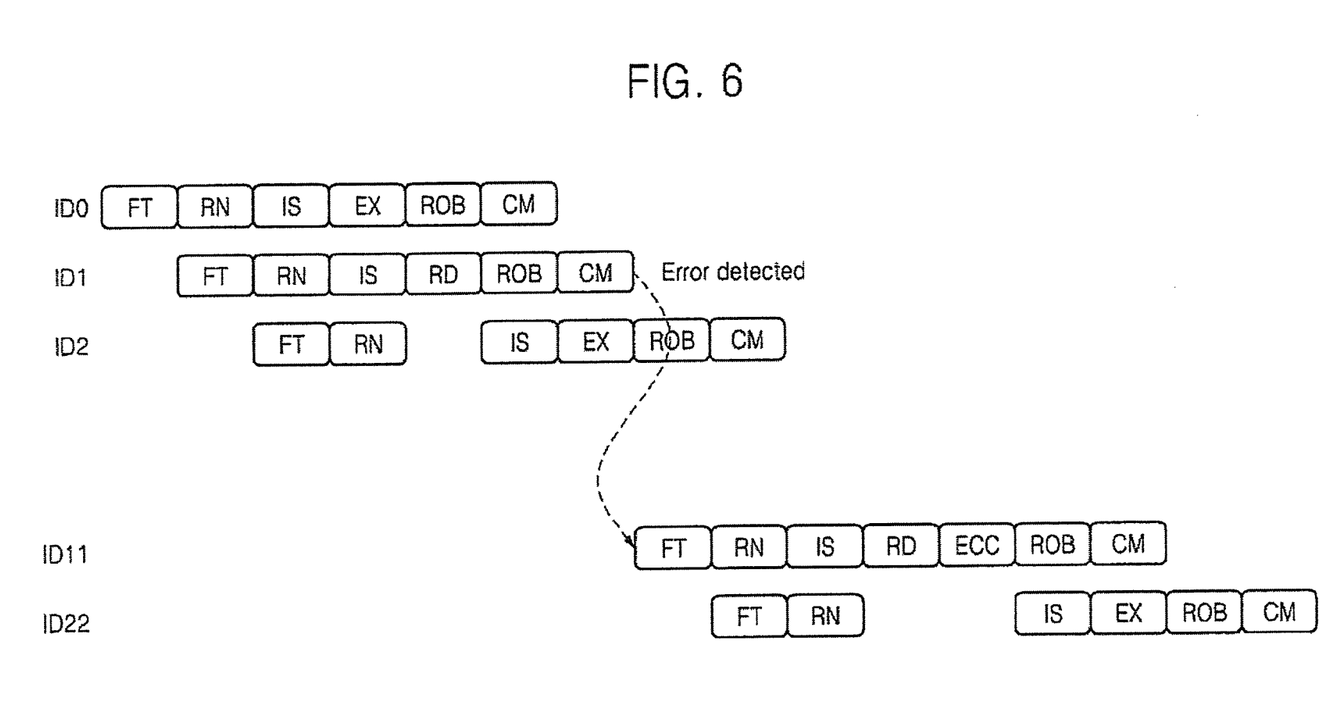
FIG. 6 is a timing diagram of the pipeline of the CPU core illustrated in FIG. 2 when an error is detected from data according to a load instruction.

FIG. 6 is a timing diagram of a pipeline of the CPU core illustrated in FIG. 2 when an error is detected from data according to a load instruction. 'ID0' indicates an addition instruction, 'ID1' indicates a load instruction and 'ID2' indicates a subtraction instruction in FIG. 6.

'ID11' indicates a load instruction executed again after an error is detected in the load instruction, and 'ID22' indicates a subtraction instruction executed again after an error is detected in the load instruction. A fetch operation FT, a rename operation RN, an issue operation IS, an arithmetic operation EX, a read operation RD, a storage operation and a commit operation DM are explained in FIG. 5, so that detailed explanation for these is omitted.

Referring to FIGS. 2 to 6, when an error is detected in data DATA after a read operation RD is executed in the load instruction ID1, the load instruction ID1 and an instruction after the load instruction ID1, i.e., the subtraction instruction ID2, are removed from the instruction issue queue 25.

The CPU core 20 executes a fetch operation FT fetching the load instruction ID11 and the subtraction instruction ID22 again from the instruction cache 50 through the instruction fetch unit 21. Corrected data CDATA are loaded through a second data channel DC2 by the execution unit 29.

Figure 7:
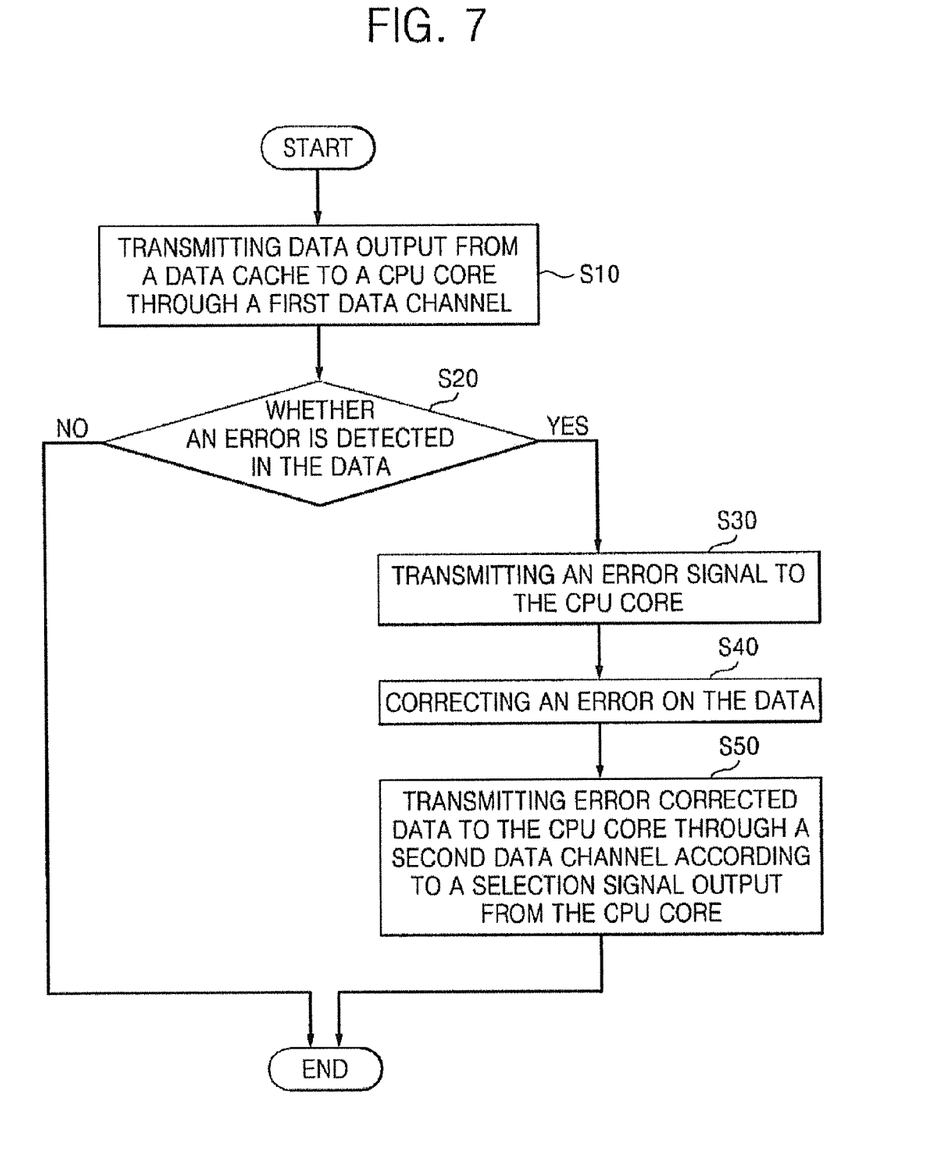
FIG. 7 is a flowchart depicting an example embodiment of an operation method of the data cache controller illustrated in FIG. 2.

FIG. 7 is a flowchart depicting an example embodiment of the data cache controller illustrated in FIG. 2. Referring to FIGS. 2, 3, 4 and 7, in step S10 the data cache controller 60 transmits data DATA output from the data cache 70 to the CPU core 20 through a first data channel DC1. For example, the first data channel DC1 may be set to a default value.

In step S20 data DATA is stored in the ROB 31 of the CPU core 20 and the ECC logic unit 63 executes an ECC check on data DATA. When an error is detected from data DATA, in step S30 the ECC logic unit 63 transmits an error signal ES having a first level to the CPU core 20. When the CPU core 20 receives an error signal ES having a first level, an 'ECC Error' flag of the ROB 31 is set to 'F'.

When the 'ECC Error' flag of the ROB 31 is set to 'F', the commit control unit 33 of the CPU core 20 outputs a selection signal SS having a first level referring to the flag set to 'F'.

Data DATA input through the first data channel DC1 are removed from the ROB 31 and the load instruction ID1 used to load data DATA is removed from the instruction issue queue 25. When an error is not detected from data DATA, the ECC logic unit 63 transmits an error signal ES having a second level to the CPU core 20.

When the CPU core 20 receives an error signal ES having a second level, the 'ECC Error' flag of the ROB 31 is set to 'T'. When the 'ECC Error' flag of the ROB 31 is set to 'T', the commit control unit 33 of the CPU core 20 outputs a selection signal SS having a second level referring to the flag set to T'. Data DATA are transited from the ROB 31 to the register file unit 27.

When an error is detected by the ECC logic unit 63, in step S40 the ECC logic unit 63 corrects an error on data DATA. The instruction fetch unit 21 fetches a load instruction ID1 again from the instruction cache 50. In step S50, the selector 65 transmits error-corrected data CDATA to the CPU core 20 through a second data channel DC2 according to a selection signal SS having a first level output from the CPU core 20 in response to an error signal ES having a first level.

After the error corrected data CDATA are completely transmitted to the CPU core 20, the CPU core 20 may output a selection signal SS having a second level to the data cache controller 60 to restore the second data channel DC2 to the first data channel DC1.

Figure 8:
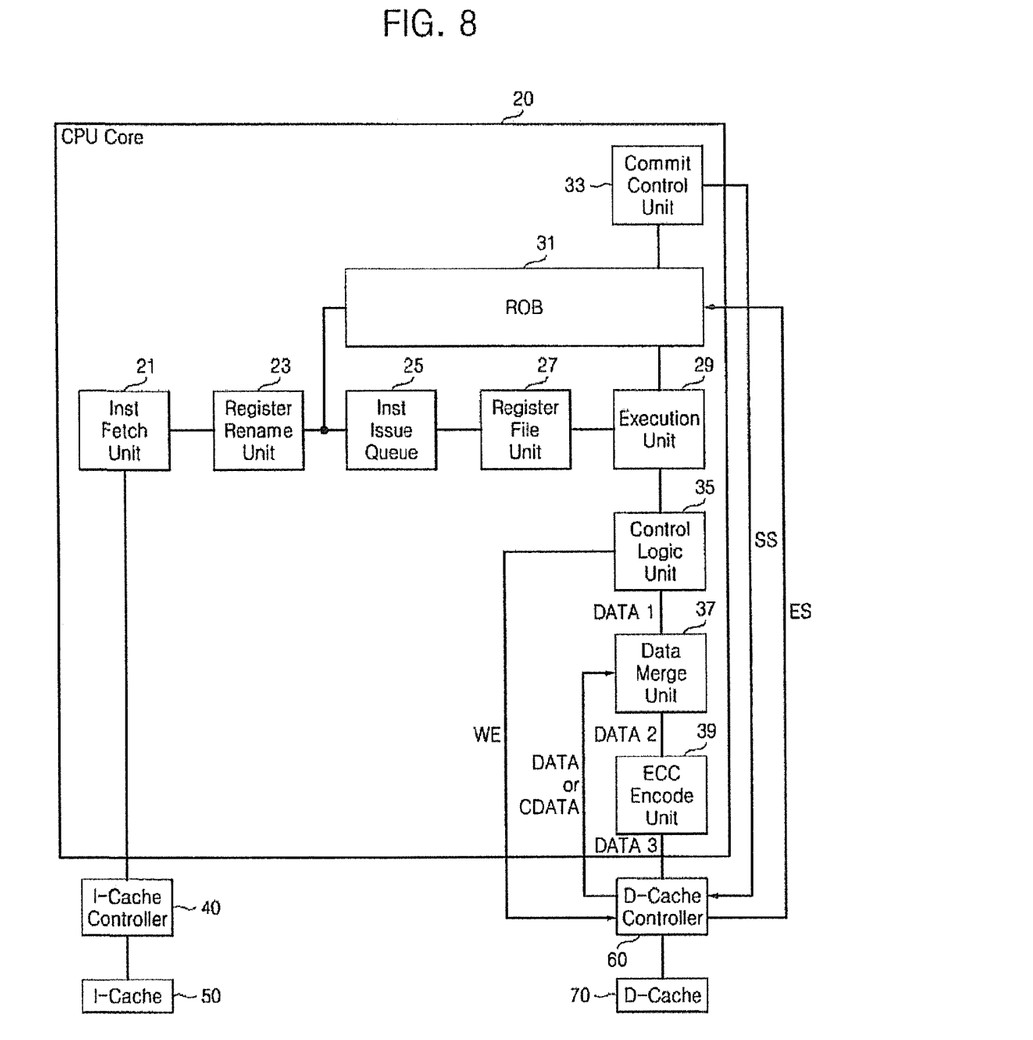
FIG. 8 is an example embodiment of the pipeline of the CPU core illustrated in FIG. 2 when a CPU core tries to write data in a data cache.

FIG. 8 is an example embodiment of the pipeline of the CPU core illustrated in FIG. 2 when the CPU core tries to write data in a data cache. Referring to FIGS. 3 and 8, the CPU core 20 includes the instruction fetch unit 21, the register rename unit 23, the instruction issue queue 25, the register file unit 27, the execution unit 29, the ROB 31, the commit control unit 33, the control logic unit 35, the data merge unit 37 and an ECC encode unit 39.

The fetch unit 21, the register rename unit 23, the instruction issue queue 25, the register file unit 27, the execution unit 29, the ROB 31 and the commit control unit 33 illustrated in FIG. 8 have an equal drawing sign and a similar operation and function to the instruction fetch unit 21, the register rename unit 23, the instruction issue queue 25, the register file unit 27, the execution unit 29, the ROB 31 and the commit control unit 33 illustrated in FIG. 4, so that detailed explanation for these is omitted.

In response to a save instruction fetched from the instruction fetch 50, the control logic unit 35 transmits a write enable signal WE to the data cache controller 60 so that data DATA1 may be stored in the data cache 70, and transmits the data DATA1 to the data merge unit 37.

The data cache controller 60 controls the data cache 70 so that data may be read from the data cache 70 in response to a write enable signal WE. A connection block 67 receives the write enable signal WE. Data DATA output from the data cache 70 are transmitted to the CPU core 20 through a first data channel DC1. That is, data DATA output from the data cache 70 are transmitted to the data merge unit 37.

The data merge unit 37 merges data DATA with data DATA1 output from the control logic unit 35 and outputs merged data DATA2 to the ECC encode unit 39.

The ECC encode unit 39 encodes the merged data DATA2 and transmits encoded data DATA3 to the data cache 70 through the data cache controller 60. Accordingly, the data cache 70 may store the encoded data DATA3.

The ECC logic unit 63 may execute an error check, e.g., an ECC check, on data DATA output from the data cache 70. When the ECC logic unit 63 detects an error of data DATA output from the data cache 70, the ECC logic unit 63 may transmit an error signal ES having a first level, e.g., a logic 1 or a high level, to the CPU core 20.

The commit control unit 33 outputs a selection signal SS having a first level in response to an error signal ES having a first level. Here, the CPU core 20 fetches a save instruction again from the instruction cache 50.

The control logic unit 35 transmits a write enable signal WE to the data cache controller 60 so that data DATA1 may be stored again in the data cache 70 in response to the save instruction, and transmits the data DATA1 to the data merge unit 37.

The selector 65 transmits again error-corrected data CDATA to the data merge unit 37 through a second data channel DC2 in response to a selection signal SS having a first level.

The data merge unit 37 merges the error-corrected data CDATA with data DATA1 output from the control logic unit 35 and outputs merged data DATA2 to the ECC encode unit 39. The ECC encode unit 39 encodes the merged data DATA2 and transmits encoded data DATA3 to the data cache 70 through the data cache controller 60. Accordingly, the data cache 70 may store the encoded data DATA3.

Figure 9:
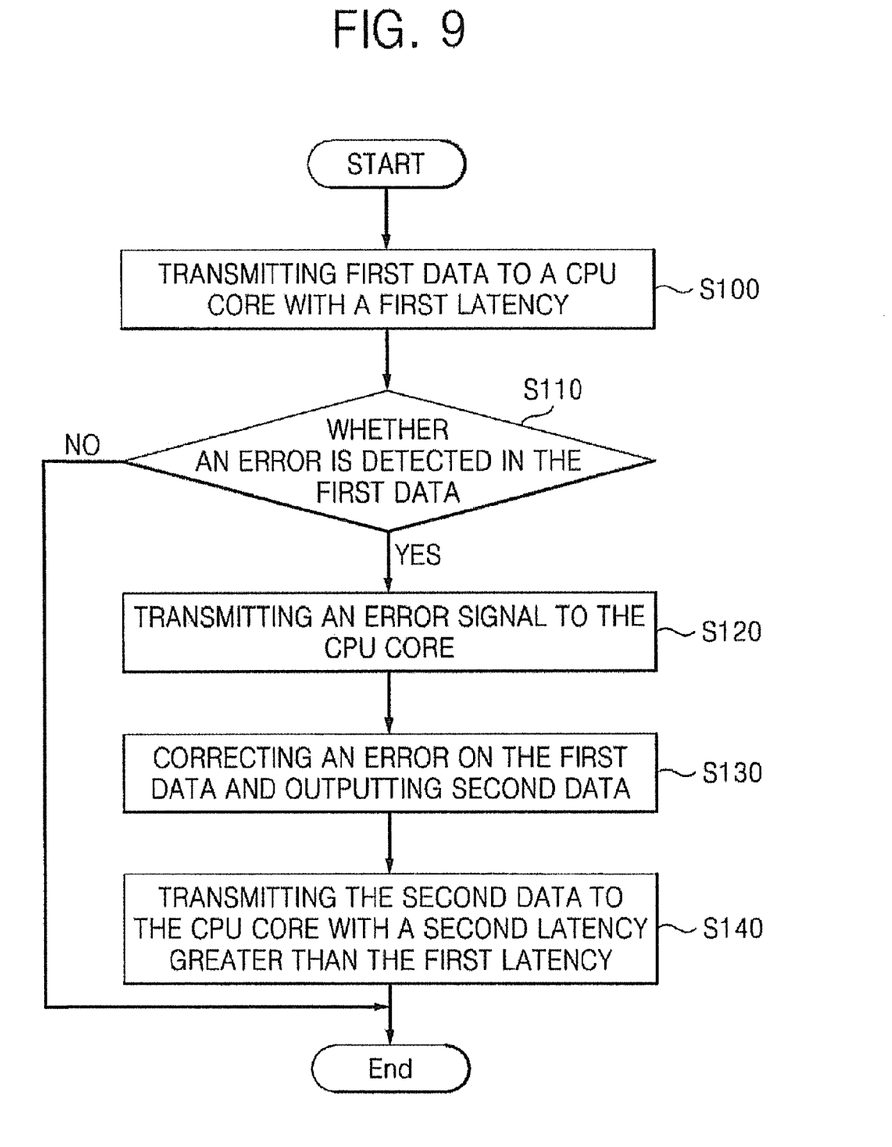
FIG. 9 is a flowchart depicting another example embodiment of the operation method of the data cache controller illustrated in FIG. 2.

FIG. 9 is a flowchart depicting another example embodiment of an operation method of the data cache controller illustrated in FIG. 2. Referring to FIGS. 2, 3 and 9, in step S100 the data cache controller 60 transmits first data DATA output from the data cache 70 to the CPU core 20 with a first latency.

The first latency means a delay between a first instruction fetched from the instruction cache 50 and transmission of the first data DATA. The first instruction is an instruction for loading the first data DATA on the CPU core 20. In step S110 the ECC logic unit 63 executes an ECC check on data DATA. When an error is detected from the data DATA, in step S120, the ECC logic unit 63 transmits an error signal ES having a first level to the CPU core 20.

When an error is not detected from the data DATA, the ECC logic unit 63 transmits an error signal ES having a second level to the CPU core 20.

When an error is detected by the ECC logic unit 63, in step S130, the ECC logic unit 63 corrects an error on data DATA and outputs error-corrected second data CDATA.

In step S140, the selector 65 transmits the error corrected second data CDATA to the CPU core 20 with a second latency according to a selection signal SS having a first level output from the CPU core 20 in response to an error signal ES having a first level.

The second latency means a delay between a second instruction fetched from the instruction cache 50 and transmission of second data CDATA. The second instruction is an instruction for loading the second data CDATA on the CPU core 20.

Figure 10:
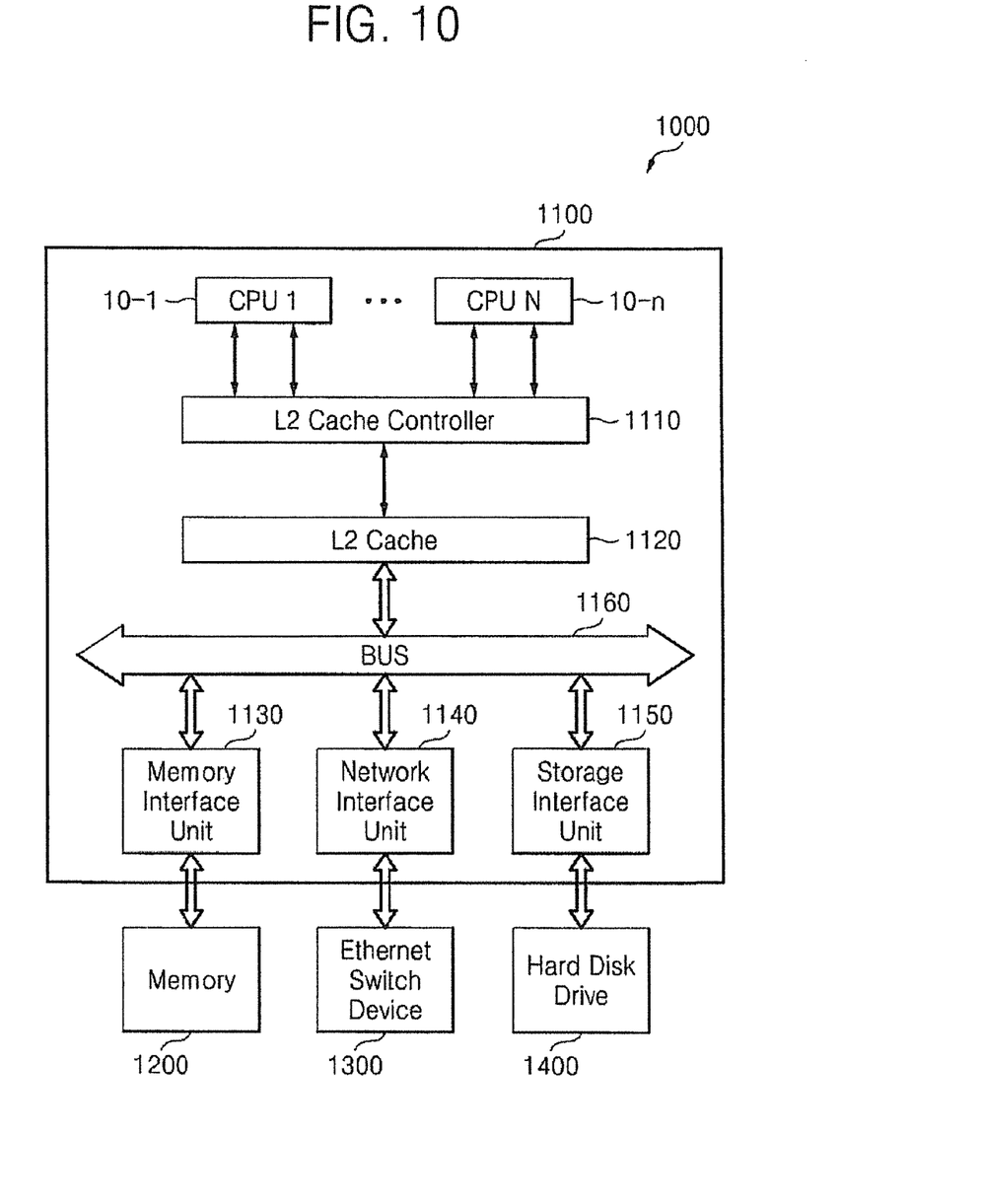
FIG. 10 is a block diagram of a server system according to at least one example embodiment.

FIG. 10 is a block diagram of a server system according to at least one example embodiment. Referring to FIG. 10, a server system 1000 may be embodied in an application server for executing soft applications, a database server for providing database services to other computers, a file server for providing a file service, or a game server for providing a video game service.

The server system 1000 includes a System on Chip (SoC) 1100, a memory 1200, an Ethernet switch device 1300 and a hard disk drive 1400.

The SoC 1100 includes more than at least one CPU 10-1, a L2 cache controller 1110 for controlling a L2 cache 1120, a memory interface unit 1130 for controlling a memory device 1200, a network interface unit 1140 for controlling the Ethernet switch device 1300 and a storage interface unit 1150 for controlling the hard disk drive 1400.

Each of the L2 cache 1120, the memory interface unit 1130, the network interface unit 1140 and the storage interface unit 1150 may transmit or receive data or an instruction through a system bus 1160.

According to an example embodiment, the SoC 1100 may include a plurality of CPUs (10-1 to 10-*n*: n is a natural number).

The CPU 10-1, the L2 cache controller 1110, the L2 cache 1120 and the memory interface unit 1130 have an operation and a function the same as or similar to the CPU 10, the L2 cache controller 80, the L2 cache 90 and the memory interface unit 11 illustrated in FIG. 2, so that detailed explanation of these is omitted. In addition, the memory 1200 has an operation and a function the same as or similar to the memory 110 illustrated in FIG. 1 so that explanation for this is omitted.

The Ethernet switch device 1300 is a computer networking device connected to a network. The Ethernet switch device 1300 executes data communication with the SoC 1100 through the network interface unit 1140. The storage interface unit 1150 executes data communication between the hard disk drive 1400 and the SoC 1100.

A data cache controller according to at least one example embodiment, devices having the same and an operation method thereof may transmit, before executing an error correction operation on data output from a data cache, the data to a CPU core and reduce a cache latency by transmitting error-corrected data to the CPU core according to a control of the CPU core when an error is detected from the data.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of operating a data cache controller comprising:
    transmitting first data output from a data cache to a central processing unit (CPU) core with a first latency; and
    transmitting second data to the CPU core with a second latency greater than the first latency; and
    generating error corrected data by performing an error correction operation on the first data,
    wherein the first latency is a delay between a read request to the data cache and transmission of the first data according to an execution of a first instruction fetched from an instruction cache,
    the second latency is a delay between a read request to the data cache and transmission of the second data according to an execution of a second instruction fetched from the instruction cache, and
    wherein the second data is output based on the error correction operation performed on the first data.

2. The method of claim 1, wherein the first data is transmitted to the CPU core through a first data channel, and the second data is transmitted to the CPU core through a second data channel.

3. The method of claim 1, further comprising:
    detecting an error in the first data and transmitting an error signal to the CPU core; and
    generating the second data by executing an error correction on the first data,
    wherein transmitting the second data to the CPU core includes transmitting the second data to the CPU core according to a selection signal output from the CPU core in response to the error signal.

4. The method of claim 3, wherein a load instruction used to load the first data on the CPU core is removed from the CPU core based on the error signal.

5. A processor comprising:
    a central processing unit (CPU) core; and
    a data cache controller, the data cache controller being configured to generate error-corrected data by performing an error correction operation on first data output from a data cache to the CPU core through a first data channel and transmit the error-corrected data to the CPU core through a second data channel according to a control of the CPU core after transmitting the first data through a first data channel.

6. The processor of claim 5, wherein the CPU core is configured to remove the first data before receiving the error-corrected data.

7. The processor of claim 5, wherein the CPU core is configured to remove, from the CPU core, a load instruction for loading the first data on the CPU core based on an error signal.

8. The processor of claim 7, wherein the CPU core is configured to fetch, from an instruction cache, a load instruction for loading the error corrected data on the CPU core based on an error signal.

9. The processor of claim 5, wherein the CPU core is configured to set the first data channel to a default channel to load the first data on the CPU core.

10. The processor of claim 5, wherein the data cache controller is configured to restore the second data channel to the first data channel based on a control signal from the CPU core after transmitting the error corrected data to the CPU core through the second data channel.

11. The processor of claim 5, wherein the data cache controller comprises a selector configured to switch the first data channel to the second data channel according to a selection signal output from the CPU core.

12. The processor of claim 5, wherein the data cache controller comprises:
    an error correction code (ECC) logic unit configured to detect an error included in the first data and output an error signal to the CPU core, and configured to generate the error corrected data by executing the error correction operation on the first data, and output the error corrected data; and
    a selector configured to transmit the data to the CPU core through the first data channel and transmit the error corrected data to the CPU core through the second data channel based on a selection signal output from the CPU core based on an error signal.

13. The processor of claim 12, wherein the CPU core comprises:
    a reorder buffer storing a flag corresponding to the error signal; and
    a commit control unit configured to output the selection signal according to the flag.

14. The processor of claim 13, wherein the CPU core further comprises: a control logic unit configured to transmit a write enable signal to the data cache controller.

15. The processor of claim 14, wherein the CPU core further comprises:
    a data merge unit configured to merge data output from the control logic unit with the first data or the error corrected data; and
    an ECC encoding unit configured to encode data output from the data merge unit.

16. An electronic device comprising:
    a processor; and
    a display configured to display data processed by the processor,
    wherein the processor includes,
        a central processing unit (CPU) core;
        an instruction cache storing a load instruction;
        a data cache storing data; and
        a data cache controller configured to transmit first data output from the data cache to the CPU core through a first data channel based on the load instruction stored by the instruction cache, generate error corrected data by executing an error correction operation on the first data, and transmit the error corrected data to the CPU core through a second data channel based on a control signal from the CPU core.

17. The electronic device of claim 16, wherein the data cache controller comprises:
   an error correction code (ECC) logic unit configured to detect an error included in the first data, output an error signal to the CPU core, execute the error correction operation on the first data and output the error corrected data; and
   a selector configured to transmit the first data to the CPU core through the first data channel and transmit the error corrected data to the CPU core through the second data channel based on a selection signal output from the CPU core based on the error signal.

18. The electronic device of claim 17, wherein the CPU core comprises:
   a reorder buffer configured to store a flag corresponding to the error signal; and
   a commit control unit configured to output the selection signal according to the flag.

19. The electronic device of claim 16, wherein the electronic device is a personal computer (PC) or a portable device.

* * * * *